US009137810B2

United States Patent
Kang

(10) Patent No.: US 9,137,810 B2
(45) Date of Patent: Sep. 15, 2015

(54) TRANSMITTING CONFIGURATION INFORMATION OF INTERFERENCE MEASUREMENT RESOURCE, AND MEASURING INTERFERENCE

(71) Applicant: KT CORPORATION, Gyeonggi-do (KR)

(72) Inventor: Seung Hyun Kang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/017,458

(22) Filed: Sep. 4, 2013

(65) Prior Publication Data

US 2014/0073336 A1    Mar. 13, 2014

(30) Foreign Application Priority Data

Sep. 7, 2012   (KR) ................. 10-2012-0099237
Oct. 19, 2012  (KR) ................. 10-2012-0116939
Dec. 12, 2012  (KR) ................. 10-2012-0144604

(51) Int. Cl.
*H04W 72/08* (2009.01)
*H04L 5/00* (2006.01)
*H04W 72/00* (2009.01)

(52) U.S. Cl.
CPC ............. *H04W 72/082* (2013.01); *H04L 5/005* (2013.01); *H04L 5/0035* (2013.01); *H04W 72/00* (2013.01)

(58) Field of Classification Search
CPC ..... H04W 24/00; H04W 4/00; H04W 72/082; H04W 72/00; H04W 36/00; H04W 24/10; H04B 15/00; H04L 25/02

USPC .......... 455/452.1, 67.11, 423, 69, 422.1, 403, 455/436, 437, 438, 450, 451, 452.2, 453, 455/70, 73; 370/252, 329, 332

See application file for complete search history.

(56) References Cited

U.S. PATENT DOCUMENTS

| | | |
|---|---|---|
| 2005/0276242 A1 | 12/2005 | Goto et al. |
| 2009/0082002 A1 | 3/2009 | Kim et al. |
| 2009/0190687 A1 | 7/2009 | Moon et al. |
| 2011/0222588 A1* | 9/2011 | Ko et al. ........................ 375/135 |
| 2012/0120891 A1* | 5/2012 | Mazzarese et al. ........... 370/329 |
| 2012/0207043 A1 | 8/2012 | Geirhofer et al. |
| 2012/0207105 A1 | 8/2012 | Geirhofer et al. |
| 2012/0208547 A1 | 8/2012 | Geirhofer et al. |
| 2013/0301465 A1 | 11/2013 | Hanbyul Seo et al. |
| 2013/0303090 A1* | 11/2013 | Hammarwall et al. .... 455/67.13 |

FOREIGN PATENT DOCUMENTS

| | | |
|---|---|---|
| WO | WO 2011105726 A2 * | 9/2011 |
| WO | 2012/096532 A2 | 7/2012 |
| WO | 2012/109037 A2 | 8/2012 |

OTHER PUBLICATIONS

Korean Intellectual Property Office, International Search Report for International Application No. PCT/KR2013/007999, Dec. 26, 2013.
Korean Intellectual Property Office, Written Opinion of the International Searching Authority for International Application No. PCT/KR2013/007999, Dec. 26, 2013.

* cited by examiner

*Primary Examiner* — Diane Mizrahi
(74) *Attorney, Agent, or Firm* — IP Legal Services, LLC

(57) ABSTRACT

The disclosure is related to transmitting configuration information of interference measurement resources (IMRs) and measuring interference in a downlink CoMP environment.

16 Claims, 10 Drawing Sheets

FIG. 2

*CSI-RS-Config information elements(IE)*

```
-- ASN1START
CSI-RS-Config-r10 ::=        SEQUENCE {
    csi-RS-r10                   CHOICE {
        release                      NULL,
        setup                        SEQUENCE {
            antennaPortsCount-r10        ENUMERATED {an1, an2, an4, an8},
            resourceConfig-r10           INTEGER (0..31),
            subframeConfig-r10           INTEGER (0..154),
            p-C-r10                      INTEGER (-8..15)
        }
    }                                                        OPTIONAL,    -- Need
ON
    zeroTxPowerCSI-RS-r10        CHOICE {
        release                      NULL,
        setup                        SEQUENCE {
            zeroTxPowerResourceConfigList-r10   BIT STRING (SIZE (16)),
            zeroTxPowerSubframeConfig-r10       INTEGER (0..154)
        }
    }                                                        OPTIONAL     -- Need
ON
}
-- ASN1STOP
```

FIG. 6

```
zeroTxPowerCSI-RS-r1x      CHOICE {
    release                NULL,
    setup                  SEQUENCE {
        zeroTxPowerResourceConfigList-r1x    BIT STRING (SIZE (16)),      → IMR index 0
        zeroTxPowerSubframeConfig-r1x        INTEGER (0..154)
    }
}
zeroTxPowerCSI-RS-r1x      CHOICE {
    release                NULL,
    setup                  SEQUENCE {
        zeroTxPowerResourceConfigList-r1x    BIT STRING (SIZE (16)),      → IMR index 1
        zeroTxPowerSubframeConfig-r1x        INTEGER (0..154)
    }
}
...
zeroTxPowerCSI-RS-r1x      CHOICE {
    release                NULL,
    setup                  SEQUENCE {
        zeroTxPowerResourceConfigList-r1x    BIT STRING (SIZE (16)),      → IMR index (N-1)
        zeroTxPowerSubframeConfig-r1x        INTEGER (0..154)
    }
}
```

FIG. 7

```
zeroTxPowerCSI-RS-r1x      CHOICE {
    release                NULL,
    setup                  SEQUENCE {
        zeroTxPowerResourceConfigList-r1x    BIT STRING (SIZE (16)),
        zeroTxPowerSubframeConfig-r1x        INTEGER (0..154)
        IMRConfigList-R1x                    BIT STRING (SIZE (16~N))
    }
}
```

FIG. 9

```
zeroTxPowerCSI-RS-r1x         CHOICE {
    release                   NULL,
    setup                     SEQUENCE {
        zeroTxPowerSubframeConfig-r1x      INTEGER (0..154)
        zeroTxPowerSubframeConfigList-r1x  BIT STRING (SIZE (T))
        {
            IMR configuration information corresponding to 0th subframe  available for IMR transmission
            IMR configuration information corresponding to 1th subframe  available for IMR transmission
            ...
            IMR configuration information corresponding to (S-1)th subframe  available for IMR transmission
            ...
        }
    }
}
```

FIG. 10

```
zeroTxPowerCSI-RS-r1x         CHOICE {
    release                   NULL,
    setup                     SEQUENCE {
        zeroTxPowerSubframeConfig-r1x      INTEGER (0..154)
        zeroTxPowerSubframeConfigList-r1x  BIT STRING (SIZE (T))
        {
            IMR configuration information corresponding to 0th subframe  available for IMR transmission
            IMR configuration information corresponding to 1th subframe  available for IMR transmission
            ...
            IMR configuration information corresponding to (S-1)th subframe  available for IMR transmission
            ...
        }
    }
}
```

TRANSMITTING CONFIGURATION INFORMATION OF INTERFERENCE MEASUREMENT RESOURCE, AND MEASURING INTERFERENCE

The present application claims priority under 35 U.S.C. §119 to Korean Patent Application No. 10-2012-0099237 (filed on Sep. 7, 2012), Korean Patent Application No. 10-2012-0116939 (filed on Oct. 19, 2012), and Korean Patent Application No. 10-2012-0144604 (filed on Dec. 12, 2012), which are hereby incorporated by reference in their entirety.

BACKGROUND

The present disclosure relates to transmitting configuration information of interference measurement resources (IMR), and measuring interference. Particularly, the present disclosure relates to methods and apparatuses for transmitting/receiving IMR configuration information used for measuring channel state information, and measuring interference using the IM resource configuration information, in a downlink coordinated multi-point transmission/reception (CoMP) environment.

In a CoMP system, at least two of transmission points cooperate with each other to transmit signals. Such a CoMP system obtains channel state information. In order to obtain the channel state information, it is required to transmit configuration information of interference measurement resources (IMRs) to user equipment, to measure interference using the IMR configuration information, and to perform a feedback transmission of a corresponding channel state information.

SUMMARY

In accordance with at least one embodiment, a method may be provided for transmitting interference measurement resource (IMR) configuration information in a transmission point. The method may include (i) determining the IMR configuration information for a downlink interference measurement of user equipment (UE); and (ii) transmitting the IMR configuration information to the user equipment, wherein the IMR configuration information is identified based on an interference measurement resource index indicating the IMR configuration information.

In accordance with another embodiment, a method may be provided for measuring interference in user equipment (UE). The method may include (i) receiving interference measurement resource (IMR) configuration information from a transmission point, wherein the IMR configuration information is identified based on an interference measurement resource index, and the interference measurement resource index indicates the IMR configuration information for a downlink interference measurement of the user equipment; and (ii) performing an interference measurement according to the received IMR configuration information.

In accordance with still another embodiment, a transmission point may be provided. The transmission point may include a control processor and a transmitter. The control processor may be configured to determine interference measurement resource (IMR) configuration information for a downlink interference measurement of user equipment. The transmitter may be configured to transmit the IMR configuration information to the user equipment. Herein, the IMR configuration information is identified based on an interference measurement resource index indicating the IMR configuration information.

In accordance with still another embodiment, user equipment may be provided. The user equipment may include a receiver and a control processor. The receiver may be configured to receive interference measurement resource (IMR) configuration information from a transmission point. Herein, the IMR configuration information is identified based on an interference measurement resource index, and the interference measurement resource index indicates the IMR configuration information for a downlink interference measurement of the user equipment. The control processor may be configured to perform an interference measurement according to the received IMR configuration information.

BRIEF DESCRIPTION OF THE DRAWINGS

FIG. 2 illustrates information elements (IE) of a "CSI-RS-Config" message transmitted by a serving transmission point;

FIG. 6 illustrates configuration information of interference measurement resources (IMRs) in a transmission point in accordance with Embodiment 2;

FIG. 7 illustrates configuring an IMR bitmap of an "IMR-ConfigList" field further included for IMR configuration in accordance with Embodiment 3;

FIG. 9 illustrates configuring a T-bit bitmap (T is a natural number) of "zeroTxPowerSubframeConfigList-rlx" in accordance with Embodiment 5;

FIG. 10 illustrates configuring a T-bit bitmap (T is a natural number) of "zeroTxPowerSubframeConfigList-rlx" in accordance with Embodiment 6;

DETAILED DESCRIPTION OF EMBODIMENTS

Figure 1:
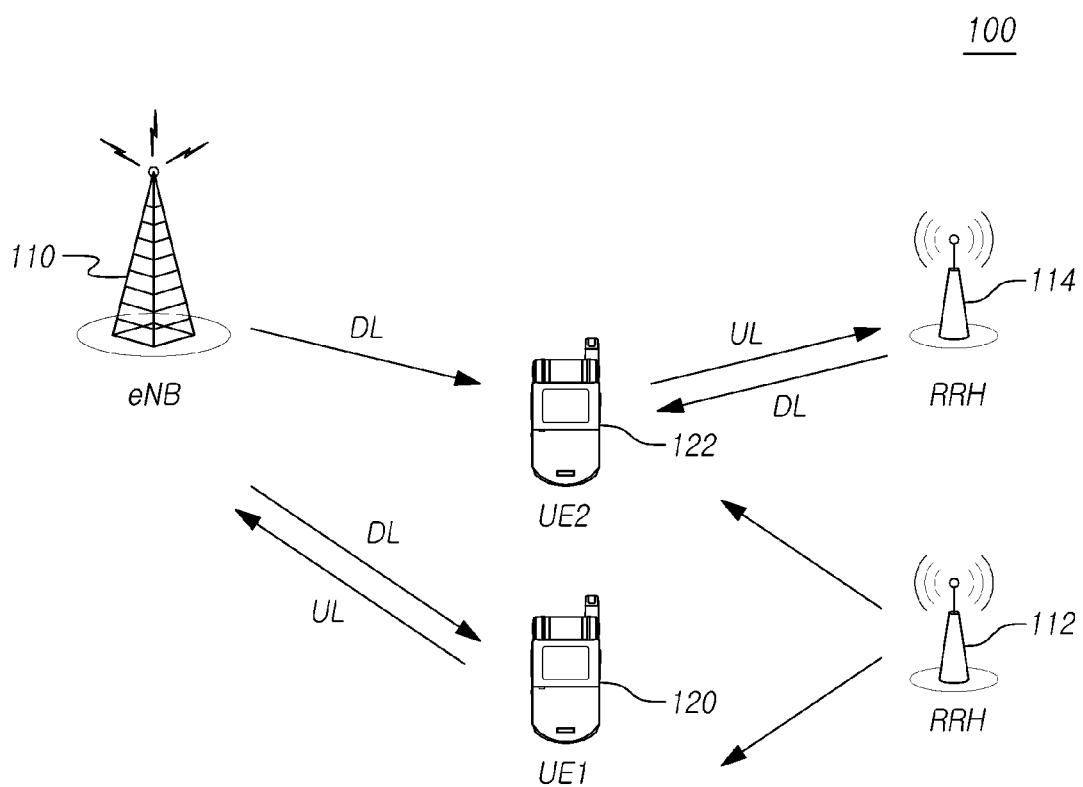
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

In accordance with at least one embodiment, a wireless communication system may be widely used to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), an antenna, and the like.

That is, in the present description, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present invention, and may not be limited to a specific term or word. Herein, an uplink (UL) transmission/reception is a scheme in which data is transmitted from user equipment to a base station. Unlike this, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present invention should not be construed as being limited to or restricted by a particular wireless communication field, and should be construed as including all technical fields to which the spirit of the present invention can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like. In the present specification, PDCCH may be a concept including an enhanced physical downlink control channel (EPDCCH).

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point). Accordingly, in the present specification, a transmission subject (i.e., a subject transmitting/sending a signal) may be referred to as "a transmission/reception point," or "a transmission point." A receiving subject (i.e., a subject receiving a signal) may be referred to as "a transmission/reception point," or "a reception point."

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include at least two or three transmission points 110, 112 and 114, and at least one user equipment (UE) 120 and 122.

The transmission points 110, 112 and 114 may be, as shown in the figure, one of eNB 110 and RRHs 112 and 114. Herein, eNB 110 may be a base station or a macrocell (or macronode). RRHs 112 and 114 may be at least one picocell which is wiredly controlled by coupling to eNB 110 through an optical cable or an optical fiber. Furthermore, RRHs 112 and 114 may have either a high transmission power, or a low transmission power within a macrocell region. eNB 110 and RRHs 112 and 114 may have the same cell identity (ID) or different cell identities.

Hereinafter, a downlink (DL) may represent communication or a communication path from transmission points 110 and 112 to user equipment 120. An uplink (UL) may represent communication or a communication path from user equipment 120 to transmission points 110, 112 and 114. In the downlink, a transmitter may be a portion of transmission points 110, 112 and 114, and a receiver may be a portion of user equipment 120 and 122. In the uplink, a transmitter may be a portion of user equipment 120, and a receiver may be a portion of transmission points 110, 112 and 114.

Hereinafter, a situation in which a signal is transmitted or received through such channels as PUCCH, PUSCH, PDCCH, and/or PDSCH may be referred to as the expression of "transmit or receive PUCCH, PUSCH, PDCCH, and/or PDSCH."

Transmission points 110, 112, and 114 may perform a downlink transmission to user equipment (e.g., UE1 (120) and/or UE 2 (122)). Transmission points 110, 112, and 114 may transmit PDSCH corresponding to a primary physical channel, for unicast transmission. Furthermore, transmission points 110, 112, and 114 may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

In this case, as described below with reference to figures, in a downlink CoMP environment, transmission points-A and B (110 and 112) may transmit a downlink signal to UE 1 (120), and transmission points-A to C (110, 112, and 114) may transmit a downlink signal to UE 2 (122). In an uplink CoMP environment, UE 1 (120) may transmit an uplink signal to reception point-A (110), and UE 2 (122) may transmit an uplink signal to reception point-C (114). In this case, it may be assumed that transmission point-A is a serving transmission point of user equipment 120 and 122 in wireless communication system 110 shown in FIG. 1.

Hitherto, CoMP environments were described with reference to FIG. 1. Hereinafter, a downlink CoMP measurement set and an interference hypothesis for calculating an interference portion of SINR ("a downlink CoMP measurement set and an interference hypothesis") will be described in more detail.

Each user equipment may have its own CoMP measurement set. The CoMP measurement set may be formed by at least one transmission point (TP) which can transmit downlink data to a corresponding user equipment. For example, UE 1 (120) may have a CoMP measurement set formed by transmission point-A and B (110 and 112). UE 2 (122) may have a CoMP measurement set formed by transmission point-A to C (110, 112, and 114).

In the case that each transmission point included in a CoMP measurement set is assumed to be a serving transmission point being transmitting downlink data to user equipment, the user equipment may perform a feedback transmission of channel state information/indication (CSI) according to a variety of CoMP schemes, such as a single point transmission (SPT), a dynamic point selection (DPS), or a dynamic point blanking (DPB).

User equipment may calculate a variety of SINR for CoMP measurement sets according to a serving transmission point and an assumed CoMP scheme, in order to perform a CSI feedback transmission, as described in Table 1 and Table 2 below. Herein, the CoMP measurement sets may be formed by two transmission points (e.g., transmission point-A (110) and transmission point-B (112)), or three transmission points (e.g., transmission point-A (110), transmission point-B (112), and transmission point-C (114)).

TABLE 1

| Serving Transmission Point | SINR | CoMP scheme |
|---|---|---|
| Transmission point-A (TP-A) | $\dfrac{S_A}{I_B + I_O + N}$ | DPS or SPT (Single Point Transmission) |
| | $\dfrac{S_A}{I_O + N}$ | DPB (TP-B Blanking) |
| Transmission point-B (TP-B) | $\dfrac{S_B}{I_A + I_O + N}$ | DPS or SPT (Single Point Transmission) |
| | $\dfrac{S_B}{I_O + N}$ | DPB (TP-A Blanking) |

TABLE 2

| Serving Transmission Point | SINR | CoMP scheme |
|---|---|---|
| Transmission point-A (TP-A) | $\dfrac{S_A}{I_B + I_C + I_O + N}$ | DPS or SPT (Single Point Transmission) |
| | $\dfrac{S_A}{I_B + I_O + N}$ | DPB (TP-C Blanking) |
| | $\dfrac{S_A}{I_C + I_O + N}$ | DPB (TP-B Blanking) |
| | $\dfrac{S_A}{I_O + N}$ | DPB (TP-B and TP-C Blanking) |
| Transmission point-B (TP-B) | $\dfrac{S_B}{I_A + I_C + I_O + N}$ | DPS or SPT (Single Point Transmission) |
| | $\dfrac{S_B}{I_A + I_O + N}$ | DPB (TP-C Blanking) |
| | $\dfrac{S_B}{I_C + I_O + N}$ | DPB (TP-A Blanking) |
| | $\dfrac{S_B}{I_O + N}$ | DPB (TP-A and TP-C Blanking) |
| Transmission point-C (TP-C) | $\dfrac{S_C}{I_A + I_B + I_O + N}$ | DPS or SPT (Single Point Transmission) |
| | $\dfrac{S_C}{I_A + I_O + N}$ | DPB (TP-B Blanking) |
| | $\dfrac{S_C}{I_B + I_O + N}$ | DPB (TP-A Blanking) |
| | $\dfrac{S_C}{I_O + N}$ | DPB (TP-A and TP-B Blanking) |

$S_A$, $S_B$, and $S_C$ may represent signal powers transmitted by transmission point-A, transmission point-B, and transmission point-C, respectively. $I_A$, $I_B$ and $I_C$ may represent interference powers transmitted from transmission point-A, transmission point-B, and transmission point-C, respectively. $I_O$ may represent an interference power transmitted from a transmission point which is not included in a corresponding CoMP measurement set. N may represent background noise.

First, in order to calculate a variety of SINR values, user equipment may receive CSI-RS from each of all transmission point included in a CoMP measurement set, and calculate a signal power value of each corresponding transmission point.

Furthermore, the user equipment may calculate an interference portion of SINR. For this, denominators of the above-described SINR formulas may be arranged according to an interference hypothesis, as described in Table 3 and Table 4 below. Herein, Table 3 indicates the case that a CoMP measurement set is formed by two transmission points. Table 4 indicates the case that a CoMP measurement set is formed by three transmission points. Interference measurement resources (IMRs) may be configured (or allocated) for the user equipment, according to an interference hypothesis. In this case, the user equipment may measure (or estimate) power of signals received through a corresponding IMR, and use the measured signal power value as an interference portion of SINR.

TABLE 3

| Interference Hypotheses | Descriptions |
|---|---|
| $I_A + I_O + N$ | TP-A: Downlink Transmission<br>TP-B: Muting |
| $I_B + I_O + N$ | TP-B: Downlink Transmission<br>TP-A: Muting |
| $I_O + N$ | TP-A and TP-B: Muting |

TABLE 4

| Interference Hypotheses | Descriptions |
|---|---|
| $I_A + I_B + I_O + N$ | TP-A and TP-B: Downlink Transmission<br>TP-C: Muting |
| $I_A + I_C + I_O + N$ | TP-A and TP-C: Downlink Transmission<br>TP-B: Muting |
| $I_B + I_C + I_O + N$ | TP-B and TP-C: Downlink Transmission<br>TP-A: Muting |
| $I_A + I_O + N$ | TP-A: Downlink Transmission<br>TP-B and TP-C: Muting |
| $I_B + I_O + N$ | TP-B: Downlink Transmission<br>TP-A and TP-C: Muting |
| $I_C + I_O + N$ | TP-C: Downlink Transmission<br>TP-A and TP-B: Muting |
| $I_O + N$ | TP-A, TP-B, and TP-C: Muting |

In the case that one IMR is configured for one interference hypothesis, transmission points included in a corresponding CoMP measurement set (i) may transmit a downlink signal to be received as an interference, to user equipment, or (ii) may not transmit a downlink signal by muting a corresponding IMR such that interference does not happen, according to the interference hypothesis as described in Table 3 and Table 4.

Hitherto, a downlink CoMP measurement set, and an interference hypothesis for calculating an interference portion of SINR were described. Hereinafter, a method of transmitting CSI-RS configuration information will be described in more detail.

As shown in FIG. 2, a serving transmission point (e.g., eNB 110) may transmit the CSI-RS configuration information to user equipment, using a "CSI-RS-Config" message among pre-defined radio resource control (RRC) messages (refer, for example, to the standard document "3GPP TS 36.331 v10.5").

Herein, each field of a "CSI-RS-Config" message may be defined as described in Table 5 below.

TABLE 5

| CSI-RS-Config field | Descriptions |
|---|---|
| antennaPortsCount | Parameter representing the number of antenna ports used for transmission of CSI-RS. "An1" corresponds to one antenna port, and "an2" corresponds to two antenna ports. |
| p-C | Parameter representing $P_c$ |
| resourceConfig | Parameter representing CSI-RS resource configuration |
| subframeConfig | Parameter representing $I_{CSI-RS}$ of CSI-RS |
| zeroTxPowerResourceConfigList | Parameter representing ZP-CSI-RS resource configuration |
| zeroTxPowerSubframeConfig | Parameter representing $I_{CSI-RS}$ of ZP-CSI-RS |

Herein, 'configuration information for CSI-RS' ("CSI-RS configuration information") of a serving transmission point may be transmitted through 'CSI-RS-r10 information element (IE)' of a "CSI-RS-Config" message. Furthermore, resource element muting information (or may be simply referred to as 'muting information') may be transmitted through 'zeroTxPowerCSI-RS-r10 IE.' Herein, the resource element muting information may be information indicating resource elements not employed for a downlink signal transmission of the serving transmission point. In the case that a different transmission point transmits CSI-RS using the same resource element as such muted resource element, a downlink signal of the serving transmission point may not affect the CSI-RS of the different transmission point as interference. Resource elements used for a resource element muting may be referred to as 'ZP-CSI-RS.'

Figure 3:
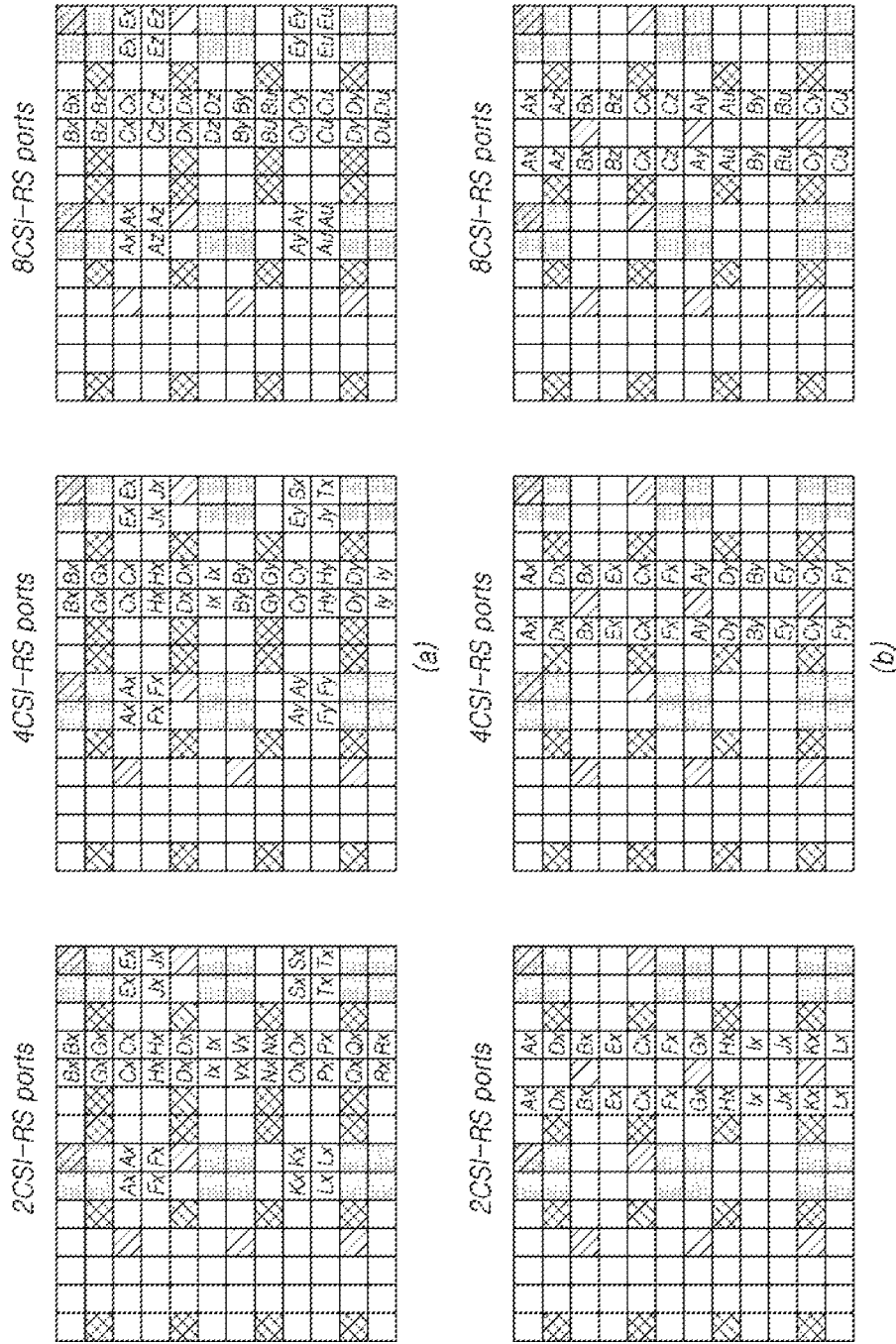
FIG. 3 illustrates positions of resource elements used for transmissions of CSI-RS and ZP-CSI-RS in one PRB pair.

FIG. 3 illustrates positions of resource elements used for transmissions of CSI-RS and ZP-CSI-RS in one physical resource block (PRB) pair.

Referring to FIG. 3, in order to transmit one CSI-RS in one PRB pair constituted by two slots, the same number of resource elements as 'the number of transmission antenna ports' (e.g., 2, 4, or 8) may be used. In FIG. 3, each of alphabet capital letters "A" through "R" may represent positions of 2, 4, or 8 resource elements pre-defined for a transmission of one CSI-RS.

Alternatively, in order to transmit one ZP-CSI-RS in one PRB pair, 4 resource elements may always be used regardless of the number of transmission antenna ports.

In the case of a frame structure for a frequency division duplex (FDD), CSI-RS and ZP-CSI-RS may be transmitted through only resource element positions corresponding to FIG. 3 (a). In the case of a frame structure for a time division duplex (TDD), CSI-RS and ZP-CSI-RS may be transmitted through only resource element positions corresponding to FIGS. 3 (a) and (b).

Configuration information of CSI-RS and ZP-CSI-RS may be transmitted through an RRC message (a "CSI-RS-Config" message), to user equipment. Herein, the RRC message may include 'resource configuration information' and 'subframe configuration information.'

The resource configuration information may be configured in a bitmap form. In a bitmap, one bit position may indicate a resource element position corresponding to one alphabet shown in FIG. 3. Table 6 below may indicate the subframe configuration information. A transmission periodicity and an offset value associated with a transmission of CSI-RS or ZP-CSI-RS may be transmitted in a unit of subframes to user equipment, according to Table 6 below.

TABLE 6

<CSI reference signal subframe configuration>

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0–4 | 5 | $I_{CSI-RS}$ |
| 5–14 | 10 | $I_{CSI-RS}$-5 |
| 15–34 | 20 | $I_{CSI-RS}$-15 |
| 35–74 | 40 | $I_{CSI-RS}$-35 |
| 75–154 | 80 | $I_{CSI-RS}$-75 |

A typical control information (e.g., a "CSI-RS-Config" message) transmitted to user equipment for a typical CSI-RS configuration may not be suitable for transmitting two or more CSI-RS and IMR configuration information to one user equipment in a downlink CoMP environment.

Hitherto, a transmission method of CSI-RS configuration information was described. Hereinafter, IMR configuration information used for a ZP-CSI-RS configuration method, and a transmission method of the IMR configuration information will be described in more detail.

Figure 4:
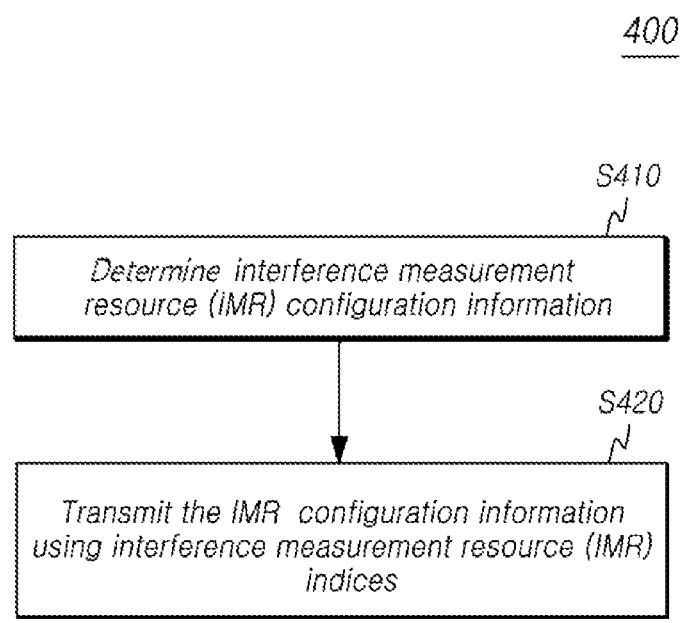
FIG. 4 is a flow chart illustrating a method of transmitting configuration information of interference measurement resources (IMRs) in a transmission point in accordance with at least one embodiment.

FIG. 4 is a flow chart illustrating a method of transmitting 'configuration information of interference measurement resources (IMR)' ("IMR configuration information") in a transmission point in accordance with at least one embodiment.

Referring to FIG. 4, in a transmission method (400) of IMR configuration information, at step S410, the transmission point may determine (i.e., configure) the IMR configuration information to be used for a downlink interference measurement of specific user equipment (UE) such that a CSI measurement can be performed in a CoMP environment. At step S420, the transmission point may identify each IMR configuration information using an interference measurement resource (IMR) index, and transmit the IMR configuration information to the user equipment. More specifically, a serving transmission point may identify the configured plurality of IMRs using IMR indices. Furthermore, when requesting a CSI feedback to user equipment, the serving transmission point may inform a preferred IMR configuration information, using the IMR indices. Herein, the IMR configuration information may include resource configuration information and subframe configuration information.

Like the case of ZP-CSI-RS, one IMR may be configured with four resource elements in one PRB pair. Like the case of ZP-CSI-RS, a transmission point may transmit IMR configuration information to user equipment, using resource configuration information and subframe configuration information.

Meanwhile, in an operation (S420) of transmitting the IMR configuration information to the user equipment, CSI-RS configuration information may be transmitted along with the IMR configuration information.

In a CoMP environment, IMR configuration information may be transmitted for a CSI measurement. Hereinafter, embodiments associated with a method of transmitting IMR configuration information will be described in more detail. Herein, the IMR configuration information transmission method may include (i) identifying the IMR configuration information using IMR indices, (ii) transmitting the IMR configuration information to user equipment, and (iii) requesting a CSI feedback to the user equipment.

Embodiment 1

Reuse of a "CSI-RS-Config" Message

CSI-RS configuration information and IMR configuration information may be used for measuring a signal power of a transmission point. The CSI-RS configuration information and IMR configuration information may be transmitted from a serving transmission point (e.g., eNB 110) to a corresponding user equipment (e.g., UE1 (120) or UE2 (122)). Herein, the serving transmission point may represent a transmission point transmitting a downlink signal to the corresponding user equipment. Accordingly, the serving transmission point (e.g., eNB 110) may transmit CSI-RS configuration information and IMR configuration information, using a "CSI-RS-Config" message shown in FIG. 2, to the corresponding user equipment (e.g., UE1 (120) or UE2 (122)). Herein, the CSI-RS configuration information may be configuration information associated with the CSI-RSs transmitted by all transmission points within a CoMP measurement set. The IMR configuration information may be configuration information associated with the IMRs required for each transmission point.

User equipment (e.g., UE1 (120) or UE2 (122)) may receive CSI-RS configuration information. Herein, the CSI-RS configuration information may be configuration information associated with the CSI-RSs transmitted by all transmission points within a CoMP measurement set. Accordingly, in this case, a serving transmission point (e.g., eNB 110) needs not to explicitly transmit ZP-CSI-RS configuration information for a resource element muting, using "zeroTxPowerCSI-RS-r10 IE." Typically, the ZP-CSI-RS configuration information for a resource element muting may be used for reducing interference which may occur between CSI-RSs and downlink signals of transmission points within a CoMP measurement set.

In Embodiment 1, a serving transmission point (e.g., eNB 110) may simultaneously transmit CSI configuration and IMR configuration to user equipment (e.g., UE1 (120) or UE2 (122)), reusing a "CSI-RS-Config" message. Herein, the CSI configuration and IMR configuration may be configured per transmission point. Configuration information for CSI-RS of a transmission point may be transmitted through "CSI-RS-r10 IE." Simultaneously, IMR configuration information may be transmitted through "zeroTxPowerCSI-RS-r10 IE." In this case, when configuring or when determining the IMR configuration information, an interference hypothesis in which a transmission signal of a transmission point transmitting CSI-RS acts as an interference may not necessarily be used for IMR configuration.

For example, in the case that CSI-RS configuration information associated with transmission point-A (110) is transmitted using "CSI-RS-r10 IE," IMR configuration information for only "interference hypotheses without $I_A$" (i.e., interference hypotheses not including $I_A$) may be transmitted using "zeroTxPowerCSI-RS-r10 IE." Herein, the interference hypotheses without $I_A$ may correspond to the remaining interference hypotheses excluding "interference hypotheses including $I_A$ (e.g., $I_A+I_B+I_O+N$, $I_A+I_C+I_O+N$, and $I_A+I_O+N$)" among the interference hypotheses described in Table 4.

As described above, necessary interference hypotheses may be determined (or differentiated) per transmission point transmitting CSI-RS, and IMRs may be configured according to the determined (differentiated) interference hypotheses. In this case, user equipment (e.g., UE1 (120) or UE2 (122)) may calculate in advance SINR values according to each interference hypothesis required for each transmission point, without an indication of a serving transmission point (e.g., eNB 110). That is, SINR values may be calculated in advance per necessary interference hypothesis of each transmission point.

IMR(s) simultaneously configured through "zeroTxPowerCSI-RS-r10 IE" may be identified based on 'a bitmap of 16 bits' ("BIT STRING (SIZE(16))") of "zeroTxPowerResourceConfigList-r10" field. In the case that at least one specific bit in the bitmap is set to '1', it is indicated that corresponding ZP-CSI-RS resources are used as IMRs. For example, in the case that IMRs are used as shown in FIG. 5, a bitmap of "zeroTxPowerResourceConfigList-r10" field may be "1000001010010000." In this case, when ZP-CSI-RS indices associated with IMR configuration are assumed to be 0, 6, 8, and 11 as shown in FIG. 5, the ZP-CSI-RS indices 0, 6, 8, and 11 may correspond to IMR indices 0, 1, 2, and 3.

Figure 5:
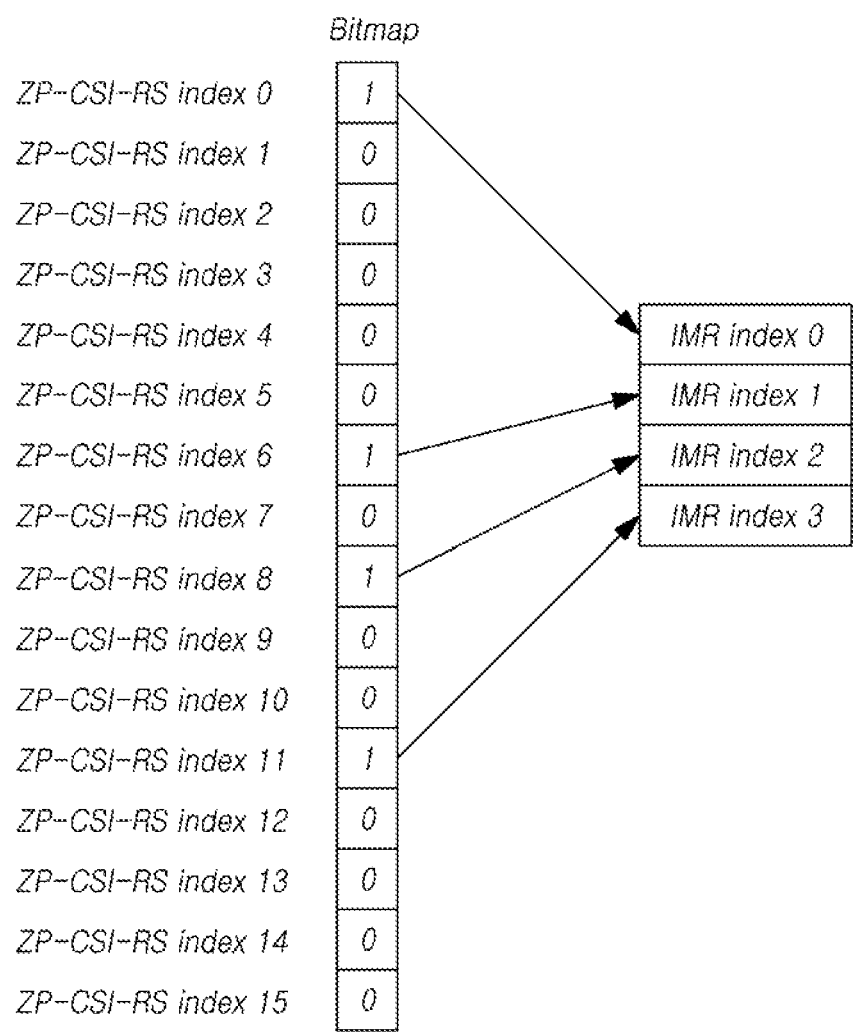
FIG. 5 illustrates IMR indices of interference measurement resources in accordance with Embodiment 1.

In addition, user equipment (e.g., UE1 (120) or UE2 (122)) may arrange only parts which are set to "1" in a bitmap as shown in FIG. 5, and identify or differentiate each IMR by performing an IMR indexing according to a bitmap sequence. A serving transmission point (e.g., eNB 110) may request a CSI feedback associated with a preferred interference hypothesis, to user equipment (e.g., UE1 (120) or UE2 (122)), using IMR indices determined according the above indexing scheme.

Embodiment 2

In the Case that Configuration Information for Each IMR is Independently Transmitted Referring to FIG. 1 and FIG. 4, as described above, a serving transmission point (e.g., eNB 110) transmitting a downlink signal to user equipment (e.g., UE1 (120) or UE2 (122)) may transmit CSI-RS configuration information and IMR configuration information to the corresponding user equipment (e.g., UE1 (120) or UE2 (122)). Herein, the CSI-RS configuration information and IMR configuration information may be transmitted for measuring signal power of transmission points. In this case, IMR configuration information may be independently transmitted per IMR. For example, As shown in FIG. 6, in the case of an N number (N is a integer of $0 \leq N \leq 16$) of IMRs, configuration information may be transmitted using an N number of independent resource configuration information ("zeroTxPowerResourceConfigList-r1x" in FIG. 6) and an N number of independent subframe configuration information ("zeroTxPowerSubframeConfig-r1x" in FIG. 6). Herein, the resource configuration information and the subframe configuration information may be independently configured per IMR. In other words, one or more IMR configuration information may be configured for user equipment (e.g., UE1 (120) or UE2 (122)). In this case, parameters configured by higher-layer signaling for IMR configuration information(s) may be zero-power CSI-RS configuration (i.e., ZP-CSI-RS configuration) and zero-power CSI-RS subframe configuration (i.e., ZP-CSI-RS subframe configuration).

IMR indices may be allocated in the order of a transmission of IMR configuration information since one ZP-CSI-RS configuration information (e.g., zeroTxPowerCSI-RS-r1x) includes one IMR configuration information.

Meanwhile, a plurality of resource configuration informations and a plurality of subframe configurations may be used. However, in other embodiments, one IMR configuration information may be used for a plurality of IMRs which use an identical subframe configuration as described in Embodiment 1. In this case, IMR indices may be allocated according to an indexing scheme (e.g., the scheme may be referred to as "a combination scheme") combining (i) a transmission sequence of IMR configuration information and (ii) a bitmap sequence used for resource configuration. More specifically, first, an IMR indexing procedure may be performed such that IMR indices increase according to the transmission sequence of IMR configuration information. Thereafter, in the case of IMR configuration information transmitting configuration information associated with a plurality of IMRs, the IMR indexing procedure may be performed such that IMR indices increase according to the bitmap sequence used for resource configuration as described in Embodiment 1. Accordingly, IMR indices may be allocated per IMR through the combination scheme.

Alternatively, in the case that a transmission sequence of IMR configuration information is not obvious, subframe configuration values of all configured IMRs may be arranged in an ascending order or a descending order. Thereafter, IMR indices may be allocated according to an arranged order of the subframe configuration values. In this case, if there are a plurality of IMRs having the same subframe configuration values, IMR indices may be allocated per IMR by increasing the IMR indices according to a bitmap sequence used for resource configuration as described in Embodiment 1.

A serving transmission point (e.g., eNB 110) may request CSI feedback associated with a preferred interference hypothesis, to user equipment (e.g., UE1 (120) or UE2 (122)), using IMR indices determined according to the above-described indexing scheme.

Embodiment 3

In the Case that an Information Element (IE) for IMR Configuration is Further Included in a "CSI-RS-Config" Message A resource element muting may be used for reducing interference which 'the transmission points within a CoMP measurement set' cause on CSI-RS transmissions of 'other transmission points not being included in the CoMP measurement set.' In this case, typically, ZP-CSI-RS configuration information for the resource element muting may be transmitted using a "zeroTxPowerResourceConfigList" field of zeroTxPowerCSI-RS IE. However, in Embodiment 3, an "IMRConfigList" field for configuring IMR configuration information may be further included in zeroTxPowerCSI-RS IE of a "CSI-RS-Config" message, as described later.

FIG. 7 illustrates configuring an IMR bitmap of an "IMRConfigList" field further included for IMR configuration in accordance with Embodiment 3.

Referring to FIG. 7, ZP-CSI-RS resource configuration information for a resource element muting may be transmitted as a bitmap of a "zeroTxPowerResourceConfigList" field. In the case that the number of ZP-CSI-RSs configured for a resource element muting is referred to as "N", the "IMRConfigList" field may be configured as a bitmap of (16-N) bits. In other words, IMRs may be configured using the remaining ZP-CSI-RS resources excluding the ZP-CSI-RSs configured for the resource element muting.

ZP-CSI-RS resources set to "0" in a bitmap for a resource element muting may be collected and used as resources for configuring IMRs. In other words, the Z-CSI-RS resources set to "0" in the bitmap may be reconfigured to an IMR bitmap. For example, in FIG. 8, indices of ZP-CSI-RSs used for a resource element muting may be assumed as 0, 6, 8 and 11 as shown in FIG. 5. 12 ZP-CSI-RS resources excluding the four ZP-CSI-RS resources may be used for IMR configuration. In this case, the 12 ZP-CSI-RS resources may be reconfigured as an IMR bitmap of 12 bits ((16-4) bits). In the reconfigured IMR bitmap, ZP-CSI-RS resources used for IMR configuration may be set to "1". For example, ZP-CSI-RS indices used for the IMR configuration may be 2, 4, 9, and 14.

Figure 8:
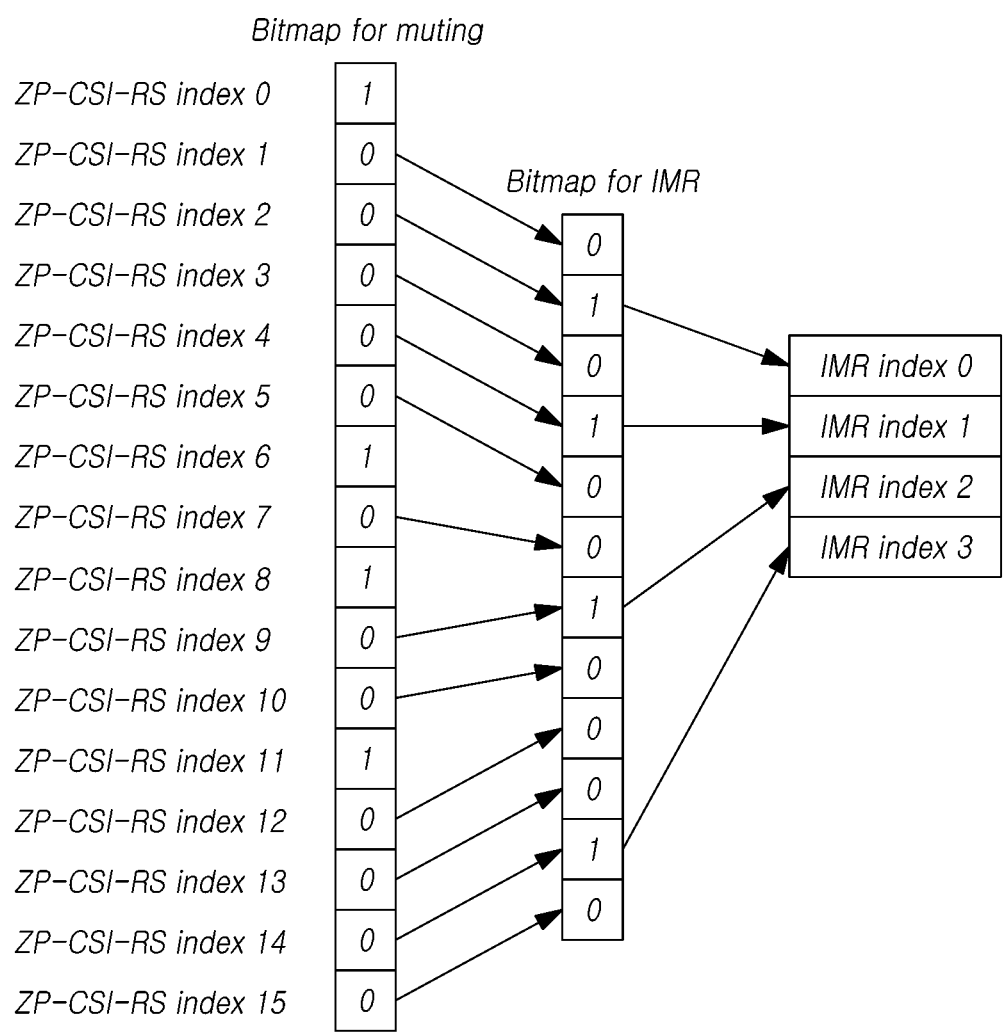
FIG. 8 illustrates IMR indices of interference measurement resources in accordance with Embodiment 4.

Furthermore, after arranging ZP-CSI-RSs set to "1" in an IMR bitmap as shown in FIG. 8, user equipment may identify each IMR by indexing according to a bitmap sequence. For example, ZP-CSI-RS indices 2, 4, 9 and 14 used for the IMR configuration may correspond to IMR indices 0, 1, 2, and 3, respectively.

A serving transmission point (e.g., eNB 110) may request a CSI feedback associated with a preferred interference hypothesis, to user equipment, using IMR indices determined according to the above-described indexing scheme.

Embodiment 4

A Scheme of Configuring IMRs in a Plurality of Subframes

In the case of configuring IMRs using a "CSI-RS-Config" message described above, a corresponding IMR set may be determined per transmission point. Furthermore, in this case, IMR set configuration information associated with each transmission point may be transmitted.

In the above case, configuration information (i.e., subframe configuration information) of subframes containing IMRs may use a "zeroTxPowerSubframeConfig-r10" field. Accordingly, only one subframe may be configured in one "CSI-RS-Config" message. In this case, a maximum number of IMRs configured in one subframe may be 16 (alphabet capital letters "A~R" in FIG. 3) as shown in FIG. 3.

However, if the number of transmission points included in a CoMP measurement set increases, the number of interference hypotheses to be considered may increase. In the case that the number of transmission points included in a CoMP measurement set is referred to as "$N_{TP}$", the number ("$N_{IH}$") of all interference hypotheses to be considered may be ($2^{N_{TP}}-1$). Table 7 below may indicate the number "$N_{IH}$" according to the number "$N_{TP}$".

TABLE 7

| $N_{TP}$ | $N_{IH}$ |
|---|---|
| 2 | 3 |
| 3 | 7 |
| 4 | 15 |
| 5 | 31 |

IMRs may be configured based on a number of interference hypotheses (i.e., an '$N_{IH}$' number of interference hypotheses). A great amount of resources in one subframe may be used for a CSI-RS transmission and a resource element muting. In these cases, resources to be used for IMR configuration may be deficient. Accordingly, in Embodiment 5 and Embodiment 6 below, a method (or scheme) of distributively configuring IMR configuration(s) using a plurality of subframes will be described in more detail.

Embodiment 5

A First Scheme of Distributively Configuring IMRs Using a Plurality of Subframes First, in order to select a plurality of subframes, values of "zeroTxPowerResourceConfigList" used for a subframe configuration of ZP-CSI-RS(s) may be used. A start index of subframes transmitting ZP-CSI-RSs and 'a transmission period of ZP-CSI-RSs' (may be referred to as "ZP-CSI-RS periodicity") may be obtained as the number of subframes, by using the "zeroTxPowerResourceConfigList' values. As described later, "T" may indicate a transmission period expressed as "the number of subframes."

All subframes within one transmission period may be used as subframes available for an IMR transmission. Alternatively, in order to reduce signaling overhead, subframes available for an IMR transmission may be selected in advance, and the subframe configuration information may be transmitted to user equipment.

Herein, the number ("S") of subframes selected for an IMR transmission may be a pre-defined value corresponding to a natural number. Alternatively, the number "S" may be variably defined in a corresponding system. Information on the "S" value may be provided to user equipment through an RRC message.

An 'S' number of subframes may be subframes corresponding to an S number of consecutive subframe indices. Herein, the S number of consecutive subframe indices may begin at an index which is spaced apart by an offset value ("O") from a start index of a corresponding subframe periodicity. The offset value "O" may be an arbitrary integer. For example, in the case that T=10, S=5, O=1, and 'i' indicates a start index of a subframe periodicity, five ("5") subframe indices available for an IMR transmission may be {i+1, i+2, i+3, i+4, i+5}.

Alternatively, an 'S' number of subframes may be subframes corresponding to an S number of selected subframe indices which are spaced by the number 'Δ'. Herein, the S number of subframe indices may begin at an index which is spaced apart by an offset value ("O") from a start index of a corresponding subframe periodicity. The 'Δ' may be defined as a function of 'T' and 'S'. For example, in the case that T=10, S=3, O=1, and 'i' indicates a start index of a subframe periodicity, if the 'Δ' is defined by Δ=FLOOR(T/S), the 'Δ' may be 3 (i.e., Δ=3). Accordingly, in this case, 3 subframe indices available for an IMR transmission may be {i+1, i+4, i+7}.

Indices of subframes available for an IMR transmission may be defined by Formula 1 below.

$$i+(O+\Delta*s) \mod T \quad \text{[Formula 1]}$$

In Formula 1, s=0, 1, . . . , Ceil(T/Δ)−1.

Alternatively, even in the case that information on an 'S' value is not notified and only information on a 'Δ' value is notified, if only 'T' and 'O' values are known, subframes available for an IMR transmission may be selected. Accordingly, the Δ value to be used in place of the S value may be a pre-defined value. Furthermore, information on the 'T' value may be variably defined in a corresponding system, and be provided to user equipment through an RRC message.

Accordingly, indices of subframes available for an IMR transmission may be defined by Formula 2 below.

$$i+(O+\Delta*s) \mod T \quad \text{[Formula 2]}$$

In Formula 2, s=0, 1, . . . , Ceil(T/Δ)−1. Herein, "Ceil" denotes a rounding up operation. For example, Ceil(0.1)=1.

In other embodiments, a separate IMR bitmap associated with subframes available for an IMR transmission among a 'T' number of subframes may be configured in an RRC message. Accordingly, information on the IMR bitmap may be transmitted to user equipment. Herein, the 'T' may represent a transmission period expressed as the number of subframes. In FIG. 9, "zeroTxPowerSubframeConfigList-r1x" may indicate a T-bit bitmap (T is a natural number). In a corresponding bitmap, bits associated with an 'S' number of selected subframes may be transmitted as '1', and the remaining bits may be transmitted as '0'.

In the case that there are an 'S' number of subframes associated with IMR configuration, an IMR bitmap may be configured per subframe, in an RRC message. Accordingly, IMR bitmaps may be configured as many as the S number of subframes. Herein, each IMR bitmap may include corresponding IMR configuration information. An IMR bitmap may be configured per subframe, according to Embodiment 1 to Embodiment 3 described above.

As describe in Embodiment 1 to Embodiment 3, each IMR may be identified by allocating IMR indices according to sequences of subframes and an IMR bitmap associated with IMRs configured within one period of the ZP-CSI-RS or CSI-RS. A serving transmission point (e.g., eNB 110) may request CSI feedback associated with a preferred interference hypothesis, to user equipment, using IMR indices determined according to the above-described scheme.

Embodiment 6

A Second Scheme of Distributively Configuring IMRs Using a Plurality of Subframes IMR information may be notified in a same manner as Embodiment 5. However, in this case, "subframeConfig" values may be used in place of "zeroTxPowerResourceConfigList" used in Embodiment 5. Herein, the "subframeConfig" values may correspond to subframe configuration information used for a CSI-RS transmission. A start index of subframes transmitting CSI-RSs and 'a transmission period of CSI-RSs' (may be referred to as "CSI-RS periodicity") may be obtained as the number of subframes, by using the "subframeConfig" values (e.g., 0~154). Furthermore, the obtained CSI-RS transmission period may be used as a 'T' value for an IMR transmission. A method of transmitting IMR configuration information may be the same as Embodiment 5.

In Embodiment 6, all subframes within one transmission period may be used as subframes available for an IMR transmission. Alternatively, in order to reduce signaling overhead, subframes available for an IMR transmission may be selected in advance, and the subframe configuration information may be transmitted to user equipment.

Herein, the number ("S") of subframes selected for an IMR transmission may be a pre-defined value. Alternatively, the number "S" may be variably defined in a corresponding system. Information on the "S" value may be provided to user equipment through an RRC message.

An 'S' number of subframes may be subframes corresponding to an S number of consecutive subframe indices. Herein, the S number of consecutive subframe indices may begin at an index which is spaced apart by an offset value ("O") from a start index of a corresponding subframe periodicity. The offset value "O" may be an arbitrary integer. For example, in the case that T=10, S=5, O=1, and 'i' indicates a start index of a subframe periodicity, 5 subframe indices available for an IMR transmission may be {i+1, i+2, i+3, i+4, i+5}.

Alternatively, an 'S' number of subframes may be subframes corresponding to an S number of selected subframe indices which are spaced by the number 'Δ'. Herein, the S number of subframe indices may begin at an index which is spaced apart by an offset value ("O") from a start index of a corresponding subframe periodicity. The 'Δ' may be defined as a function of 'T' and 'S'. For example, in the case that T=10, S=3, O=1, and 'i' indicates a start index of a subframe periodicity, if the 'Δ' is defined by Δ=FLOOR(T/S), the 'Δ' may be 3 (i.e., A=3). Accordingly, in this case, 3 subframe indices available for an IMR transmission may be {i+1, i+4, i+7}.

Indices of subframes available for an IMR transmission may be defined by Formula 3 below.

$$i+(O+\Delta *s) \bmod T \quad \text{[Formula 3]}$$

In Formula 3, s=0, 1, ..., S−1.

Alternatively, even in the case that information on an 'S' value is not notified and only information on a 'Δ' value is notified, if only 'T' and 'O' values are known, subframes available for an IMR transmission may be selected. Accordingly, the Δ to be used in replacement of the S value may be a pre-defined value. Furthermore, information on the 'T' value may be variably defined in a corresponding system, and be provided to user equipment through an RRC message.

Accordingly, indices of subframes available for an IMR transmission may be defined by Formula 4 below.

$$i+(O+\Delta *s) \bmod T \quad \text{[Formula 4]}$$

In Formula 4, s=0, 1, ..., Ceil(T/Δ)−1.

In other embodiments, a separate IMR bitmap associated with subframes available for an IMR transmission among a 'T' number of subframes may be configured in an RRC message. Accordingly, information on the IMR bitmap may be transmitted to user equipment. Herein, the 'T' may represent a transmission period expressed as the number of subframes. In this case, the "zeroTxPowerSubframeConfig" field which is used for a subframe configuration associated with ZP-CSI-RSs in a typical scheme or Embodiment 5 may be deleted. The RRC message may be configured as shown in FIG. 10. In FIG. 10, "zeroTxPowerSubframeConfigList-rlx" may indicate a T-bit bitmap. In a corresponding bitmap, bits associated with an 'S' number of selected subframes may be transmitted as '1', and the remaining bit(s) may be transmitted as '0'.

In the case that there are an 'S' number of subframes associated with IMR configuration, an IMR bitmap may be configured per subframe, in an RRC message. Accordingly, IMR bitmaps may be configured as many as the S number of subframes. Herein, each IMR bitmap may include corresponding IMR configuration information. An IMR bitmap may be configured per subframe, according to Embodiment 1 to Embodiment 3 described above.

As described with respect to Embodiment 1 to Embodiment 3, each IMR may be identified by allocating IMR indices according to sequences of subframes and an IMR bitmap associated with IMRs configured within one period of the ZP-CSI-RS or CSI-RS. A serving transmission point (e.g., eNB 110) may request CSI feedback associated with a preferred interference hypothesis, to user equipment, using IMR indices determined according to the above-described scheme.

Hitherto, embodiments associated with a method of configuring IMR configuration information for IMRs, and transmitting the IMR configuration information using IMR indices, in CoMP environments were described in detail. Hereinafter, a method of performing an interference measurement in user equipment according to Embodiment 1 to Embodiment 3 described above will be described in more detail. Furthermore, other embodiments (e.g., Embodiment 4 to Embodiment 6) may be applied in a same manner.

Figure 11:
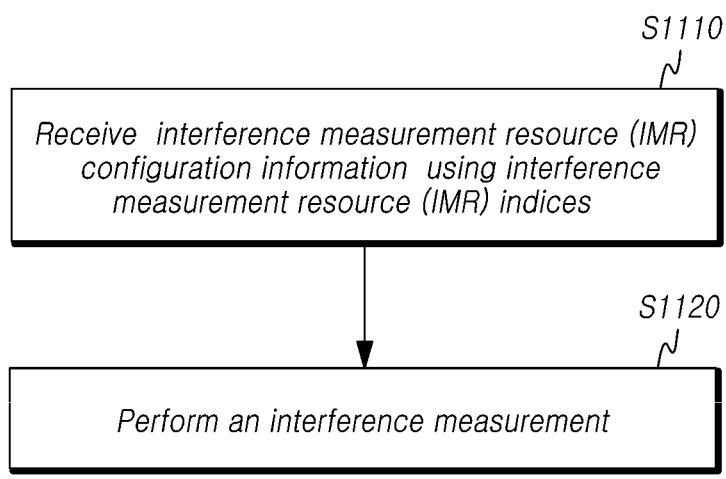
FIG. 11 is a flowchart illustrating a method of measuring interference in user equipment in accordance with at least one embodiment.

FIG. 11 is a flowchart illustrating a method of measuring interference in user equipment in accordance with at least one embodiment.

Referring to FIG. 11, in a method (1100) of measuring interference in the user equipment, the user equipment may receive 'interference measurement resource (IMR) configuration information' (or may be referred to as 'IM resource configuration information') from a transmission point at step S1110. Herein, each IMR configuration information may be identified based on an IMR index (or may be referred to as 'IM resource index'). The IMR index (or IMR indices) may indicate the IMR configuration information to be used for a downlink interference measurement of the user equipment. At step S1120, the user equipment may perform an interference measurement according to the received IMR configuration information.

The IMR configuration information may include resource configuration information and subframe configuration information.

The resource configuration information may include configuration information associated with four resource elements in one physical resource block (PRB) pair. Herein, the four resource elements may be assigned (i.e., used) for a zero power-channel state information-reference signal (ZP-CSI-RS) configuration.

In an operation (step S1110) of receiving the IMR configuration information from the transmission point, the user equipment may receive IMR configuration information through a UE-specific RRC message from the transmission point.

In an operation (step S1110) of receiving the IMR configuration information from the transmission point, the user equipment may receive CSI-RS configuration information along with the IMR configuration information.

Meanwhile, user equipment may receive IMR configuration information using an IMR index (or IMR indices) from a transmission point. In this case, the IMR configuration information may be identified based on the IMR index as described in Embodiment 1 to Embodiment 6. The user equipment may perform an interference measurement according to a corresponding interference hypothesis described above, using the IMR index (or IMR indices). Thereafter, the user equipment may perform a feedback transmission of channel state information (CSI) to the transmission point, according to an interference measurement result.

Figure 12:
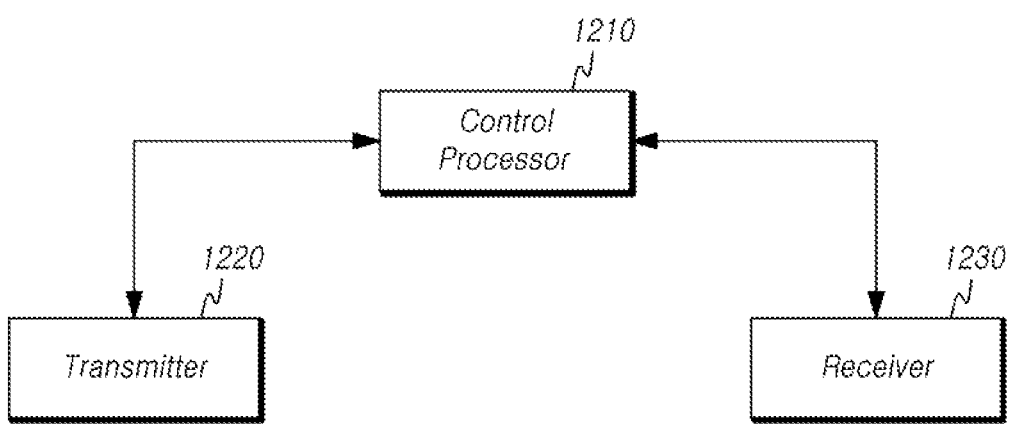
FIG. 12 is a diagram illustrating a base station in accordance with some embodiments.

FIG. 12 is a diagram illustrating a base station in accordance with some embodiments.

Referring to FIG. 12, base station (BS) 1200 corresponding to a transmission/reception point may include control processor 1210, transmitter 1220, and receiver 1230 in accordance with at least one embodiment.

Control processor 1210 may control operations of base station 1200, according to a CoMP operation required for performing the present embodiment.

Transmitter 1220 and receiver 1230 may respectively transmit and receive signals, messages, and/or data required for performing the present embodiment, in connection with user equipment.

Base station (BS) 1200 described with reference to FIG. 12 may perform all IMR transmission methods of a transmission point according to Embodiment 1 to Embodiment 6, through control processor 1210, transmitter 1220, and receiver 1230.

Control processor 1210 may configure IMR configuration information to be used for a downlink interference measurement of specific user equipment. In this case, transmitter 1220 may identify the IMR configuration information using an IMR index (or IMR indices), and transmit the identified IMR configuration information to the user equipment. Herein, the IMR index (or IMR indices) may indicate the IMR configuration information. Transmitter 1120 may transmit the IMR configuration information along with CSI-RS configuration information.

Figure 13:
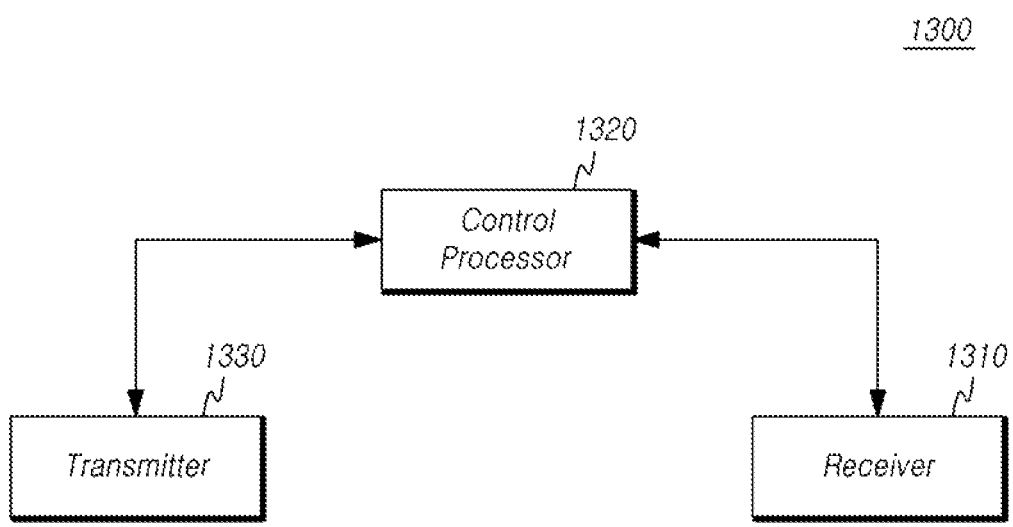
FIG. 13 is a diagram illustrating user equipment in accordance with some embodiments.

FIG. 13 is a diagram illustrating user equipment in accordance with some embodiments.

Referring to FIG. 13, user equipment 1300 may include receiver 1310, control processor 1320, and transmitter 1330 in accordance with at least one embodiment.

Receiver 1310 may receive downlink control information, data, and/or messages through a corresponding channel from a base station.

Control processor 1320 may control operations of user equipment 1300, according to a CoMP operation required for performing the present embodiment.

Transmitter 1330 may transmit control information, data, and/or messages through a corresponding channel to a base station.

The user equipment 1300 described with reference to FIG. 13 may perform one to substantially all interference measurement methods of user equipment according to Embodiment 1 to Embodiment 6, through receiver 1310, control processor 1320, and transmitter 1330.

Receiver 1310 may receive interference measurement resource (IMR) configuration information from a transmission point (e.g., a base station). Herein, the IMR configuration information may be identified based on an IMR index (or IMR indices). The IMR index (or IMR indices) may indicate the IMR configuration information to be used to a downlink interference measurement of the user equipment. Meanwhile, control processor 1320 may perform an interference measurement according to the received IMR configuration information. In this case, receiver 1310 may receive the IMR configuration information from the transmission point through a UE-specific RRC message. Furthermore, receiver 1310 may receive CSI-RS configuration information along with the IMR configuration information.

In the above-described case, in operations of base station 1200 and user equipment 1300, the IMR configuration information may include resource configuration information and subframe configuration information. Herein, the resource configuration information may include configuration information associated with four resource elements in one physical resource block (PRB) pair. The four resource elements may be assigned (i.e., used) for a zero power-channel state information-reference signal (ZP-CSI-RS) configuration.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting interference measurement resource (IMR) configuration information in a transmission point in a coordinated multi-point transmission/reception (CoMP) system, the method comprising:

determining the IMR configuration information for a downlink interference measurement of user equipment (UE), based on a CoMP measurement set associated with the user equipment, wherein the CoMP measurement set is formed by at least two transmission points and includes muting information associated with at least one transmission point of the at least two transmission points; and transmitting the IMR configuration information to the user equipment, wherein the IMR configuration information includes information on at least one IMR configured for the downlink interference measurement of the user equipment, wherein each of the at least one IMR is identified based on a corresponding IMR index.

2. The method of claim 1, wherein the IMR configuration information includes resource configuration information and subframe configuration information.

3. The method of claim 2, wherein each of the at least one IMR includes four resource elements in one physical resource block (PRB) pair.

4. The method of claim 1, wherein the transmitting the IMR configuration information to the user equipment includes:
   transmitting the IMR configuration information to the user equipment through a UE-specific radio resource control (RRC) message.

5. A method of measuring interference in user equipment (UE) in a coordinated multi-point transmission/reception (CoMP) system, the method comprising:
   receiving interference measurement resource (IMR) configuration information from a transmission point, wherein (i) the IMR configuration information includes information on at least one IMR configured for a downlink interference measurement of the user equipment, wherein each of the at least one IMR is identified based on a corresponding IMR index, (ii) the IMR configuration information is determined based on a CoMP measurement set associated with the user equipment, and (iii) the CoMP measurement set is formed by at least two transmission points and includes muting information associated with at least one transmission point of the at least two transmission points; and
   performing an interference measurement according to the received IMR configuration information.

6. The method of claim 5, wherein the IMR configuration information includes resource configuration information and subframe configuration information.

7. The method of claim 6, wherein each of the at least one IMR includes four resource elements in one physical resource block (PRB) pair.

8. The method of claim 5, wherein the receiving the IMR configuration information from the transmission point includes:
   receiving the IMR configuration information from the transmission point through a UE-specific RRC message.

9. A transmission point in a coordinated multi-point transmission/reception (CoMP) system, the transmission point comprising:
   a control processor configured to determine interference measurement resource (IMR) configuration information for a downlink interference measurement of user equipment (UE), based on a CoMP measurement set associated with the user equipment, wherein the CoMP measurement set is formed by at least two transmission points and includes muting information associated with at least one transmission point of the at least two transmission points; and
   a transmitter configured to transmit the IMR configuration information to the user equipment, wherein the IMR configuration information includes information on at least one IMR configured for the downlink interference measurement of the user equipment, wherein each of the at least one IMR is identified based on a corresponding IMR index.

10. The transmission point of claim 9, wherein the IMR configuration information includes resource configuration information and subframe configuration information.

11. The transmission point of claim 10, wherein each of the at least one IMR includes four resource elements in one physical resource block (PRB) pair.

12. The transmission point of claim 9, wherein the transmitter is configured to transmit the IMR configuration information to the user equipment through a UE-specific RRC message.

13. User equipment (UE) in a coordinated multi-point transmission/reception (CoMP) system, the user equipment comprising:
   a receiver configured to receive interference measurement resource (IMR) configuration information from a transmission point, wherein (i) the IMR configuration information includes information on at least one IMR configured for a downlink interference measurement of the user equipment, wherein each of the at least one IMR is identified based on a corresponding IMR index, (ii) the IMR configuration information is determined based on a CoMP measurement set associated with the user equipment, and (iii) the CoMP measurement set is formed by at least two transmission points and includes muting information associated with at least one transmission point of the at least two transmission points; and
   a control processor configured to perform an interference measurement according to the received IMR configuration information.

14. The user equipment of claim 13, wherein the IMR configuration information includes resource configuration information and subframe configuration information.

15. The user equipment of claim 14, wherein each of the at least one IMR includes four resource elements in one physical resource block (PRB) pair.

16. The user equipment of claim 13, wherein the receiver is configured to receive the IMR configuration information from the transmission point through a UE-specific RRC message.

* * * * *